United States Patent [19]
Eberle

[11] Patent Number: 4,720,227
[45] Date of Patent: Jan. 19, 1988

[54] METHODS OF AND APPARATUS FOR STACKING BATTERY PLATES AND THE LIKE

[76] Inventor: William J. Eberle, 2812 Riverlake Ct., Irving, Tex. 75060

[21] Appl. No.: 834,624

[22] Filed: Feb. 27, 1986

Related U.S. Application Data

[63] Continuation-in-part of Ser. No. 598,361, Apr. 9, 1984, abandoned.

[51] Int. Cl.$^4$ ............................................ B65H 39/04
[52] U.S. Cl. ........................................ 414/32; 271/93; 271/103; 271/106; 271/118; 294/64.1; 414/42; 414/121; 414/627; 414/752; 414/786; 901/46
[58] Field of Search ..................... 198/421; 271/91, 93, 271/103, 106, 118; 294/64.1, 907; 414/41, 42, 786, 32, 121, 626, 627, 752, 737, 744 A; 901/32, 40, 46

[56] References Cited

U.S. PATENT DOCUMENTS

| | | | |
|---|---|---|---|
| 2,704,593 | 3/1955 | Galloway | 198/421 |
| 3,485,393 | 12/1969 | Wilder | 294/64.1 X |
| 3,724,687 | 4/1973 | Marschke et al. | 294/64.1 X |
| 3,964,953 | 6/1976 | Mitchard et al. | 294/64.1 X |

FOREIGN PATENT DOCUMENTS

2339487  2/1974  Fed. Rep. of Germany ..... 294/64.1

*Primary Examiner*—Frank E. Werner
*Assistant Examiner*—Janice Krizek
*Attorney, Agent, or Firm*—Kanz, Scherback & Timmons

[57] ABSTRACT

The battery plate stacker includes a plurality of heads having pickup members located on the ends thereof for temporarily attaching either separators or plates to the heads as is appropriate. The heads are pivotal between stacks of plates or separators and a conveyor that is disposed between the stacks of plates and stacks of separators. The stacker includes control apparatus that prevents retraction of the heads unless a plate or separator is attached thereto and prevents swinging of the heads between the stacks and the conveyor until all of the heads are retracted.

15 Claims, 11 Drawing Figures

METHODS OF AND APPARATUS FOR STACKING BATTERY PLATES AND THE LIKE

CROSS-REFERENCE TO RELATED APPLICATION

This application is a continuation-in-part of Ser. No. 598,361 for "Apparatus for Stacking Battery Plates and the Like" filed Apr. 9, 1984, now abandoned.

BACKGROUND OF THE INVENTION

1. Field of the Invention

This invention relates generally to methods of and apparatus for stacking battery elements such as battery plates, separators, and enveloped battery plates. More particularly, but not by way of limitation, this invention relates to an improved battery plate stacker that is relatively simple in construction, easy to maintain, and operates automatically to assure that the required number and proper distribution of battery elements is accomplished during the production of storage batteries.

2. Description of the Prior Art

In previously constructed battery element stackers, several problems have been encountered. One problem has been that the device used to pick up the elements and place them into a stack may pick up two or more of the plates or separators, and thus the stack does not comply with the required arrangement. Another problem has been that the device used for picking up the plates or separators may fail to pick up a plate or separator, and thus the battery stack will be missing one of the plates or separators, and therefore, no comply with the required battery stack arrangement.

The foregoing problems have been eliminated in the battery plate stacking apparatus constructed in accordance with the invention and described in detail hereinafter.

SUMMARY OF THE INVENTION

An object of this invention is to provide methods and apparatus for capturing topmost elements from supplies of elements and transferring the captured elements to depository zones. Another object is to provide an improved battery element stacking apparatus and methods that automatically, efficently and accurately stack battery elements such as plates and separators required for a particular battery arrangement.

The apparatus for capturing top most elements from supplies of elements and transferring the captured top most elements to depository zones comprises a plurality of vacuum pick-up means with each of the means comprising a flexible cup-shaped member having a central opening. Each of the pick-up means has a stationary sensing means remote from the cup-shaped member for sensing variations in vacuum pressure applied to the cup-shaped member at the central opening. Means responsive to the sensing means individually moves each of the pick-up means toward and away from the top most elements of the supplies of elements. A switch means responsive to maximum movement of the cup-shaped members away from the supply of elements produces a signal in response to which means move the cup-shaped members simultaneously toward a zone for depositing elements held by the pick-up means.

The improved apparatus provided herein includes a frame upon which stacks of the battery plates and separators are positioned, conveyor means adjacent to the plates and extending along the frame for receiving stacks of plates and a plurality of retractable and extendable heads pivotally carried by the frame and located adjacent to the plates and the conveyor means. The improvement comprises a pickup device carried by each of the heads that is engageable with one of the elements for temporarily attaching an element to the head for transporting the element from one of the stacks to the conveyor; and, also comprises control apparatus for preventing retraction of the heads that do not have a battery element attached thereto and will cause the heads to swing over the conveyor to deposit the battery elements only when all heads are retracted and loaded.

The method of the invention provides an improved method of forming a battery stack comprised of alternate positive and negative plates with separators interposed between the plates and includes the steps of: simultaneously engaging a portion of each top plate; flexing each top plate upon engagement to effect a separation between top plates and adjacent plates; effecting a temporary connection with the top plates and, transferring the top plates to appropriate positions to form the battery stack. The foregoing steps are then performed upon the separators with the operation continuing, first upon the plates, then upon the separators.

DETAILED DESCRIPTION OF THE PREFERRED EMBODIMENT

Figure 1:
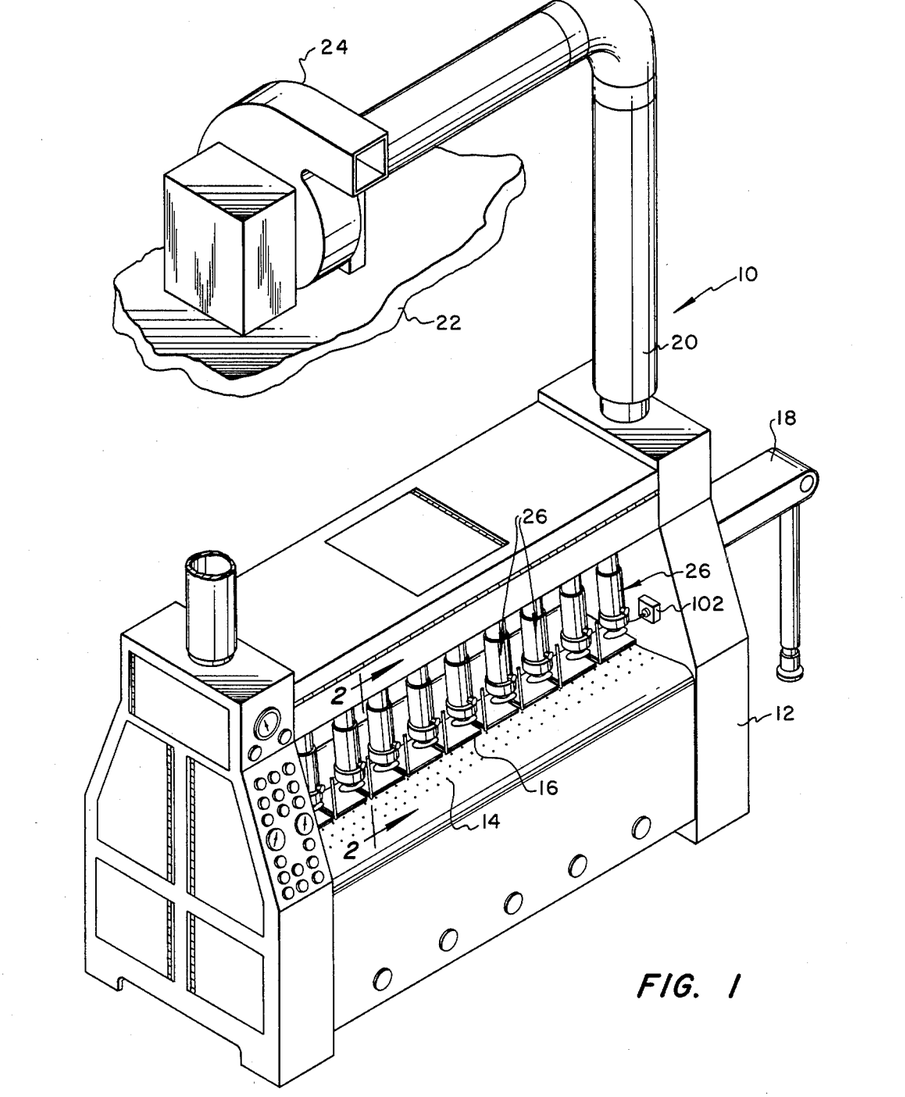
FIG. 1 is a perspective view of battery stacking apparatus incorporating features that are constructed in accordance with the invention.

Referring to the drawing and FIG. 1 in particular, shown therein and designated by the reference character 10, is apparatus for capturing topmost elements from supplies of elements that is constructed in accordance with the present invention.

In the embodiment of the invention described the apparatus is designed to capture and to stack battery elements designated as positive plates, negative plates, separators and enveloped plates.

The element or plate stacking apparatus 10 includes a housing 12 having a bed or frame 14 located therein that supports a plurality of battery plate stacks 16 adjacent to one side of a conveyor 18. Generally, stacks of positive and negative plates will be arranged in alternate stacks. While only the end of the conveyor 18 projecting from the housing 12 can be seen in FIG. 1, the conveyor 18 extends through the housing 12 adjacent to the stacks of plates 16. Preferably, the housing 12 is provided with additional frame space that is disposed on the opposite side of the apparatus 10. The additional frame space will accomodate a similar number of stacks of plates or separators as required to formulate the desired battery stacks. Where enveloped plates are utilized, separators are dispensed with and the stacks of battery plates along one side of the conveyor will be positive plates and negative plates will be stacked along an opposite side of the conveyor.

The housing 12 also supports a vacuum conduit 20 that extends upwardly through the ceiling or roof 22 of the room in which the battery stacking apparatus 10 is located. The conduit 20 extends into communication with the inlet of a blower 24 that is mounted on the roof 22. The arrangement is such that a vacuum or partial vacuum will be pulled through the conduit 20 for purposes which will become more apparent hereinafter.

Figure 2:
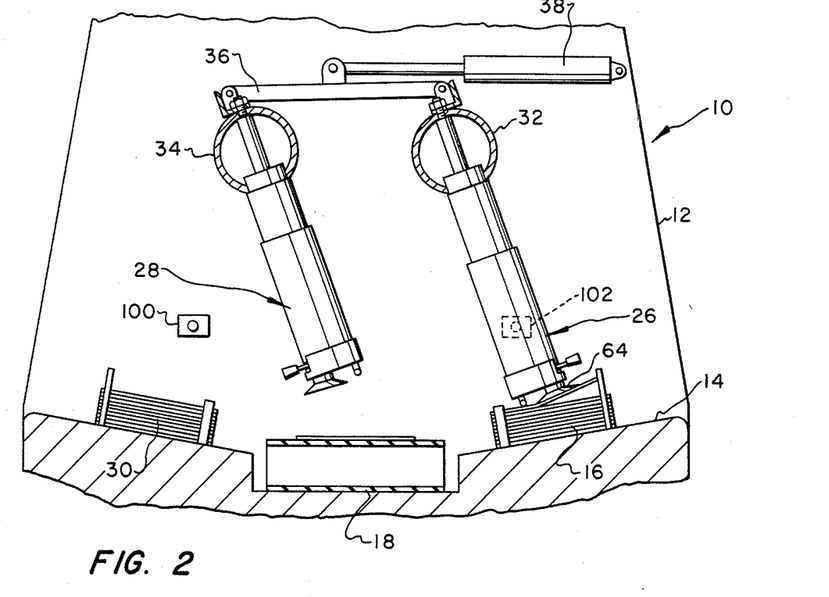
FIG. 2 is a partial, cross-sectional view taken generally along the line 2—2 of FIG. 1.

As can be seen in FIG. 1 and FIG. 2, the apparatus 10 is provided with a plurality of spaced, extendable and retractable vacuum pick-up means or heads 26 and 28. The heads 28 are not shown in FIG. 1 since they are on the opposite side of the apparatus 10 to the side shown. Generally, the heads 26 are adjacent to the stacks of plates 16 previously mentioned while the heads 28 operate between the conveyor 18 and stacks of separators 30 located in the additional frame space. The heads 26 are mounted in spaced relation as illustrated in FIG. 1, on a cylindrical member 32, a vacuum manifold, that is pivotally supported by the housing 12. Similarly, the heads 28 are mounted on a cylindrical member 34, a vacuum manifold, that is also pivotally supported by the frame 12.

As also may be seen in FIG. 2, the cylindrical members 32 and 34 are interconnected by a swing link 36. Due to the pivotal connection of the link 36 to the cylindrical members 32 and 34, the heads 26 and 28 are moved in concert in response to the reciprocation of a hydraulically-actuated, double-acting swing cylinder 38.

Figure 3:
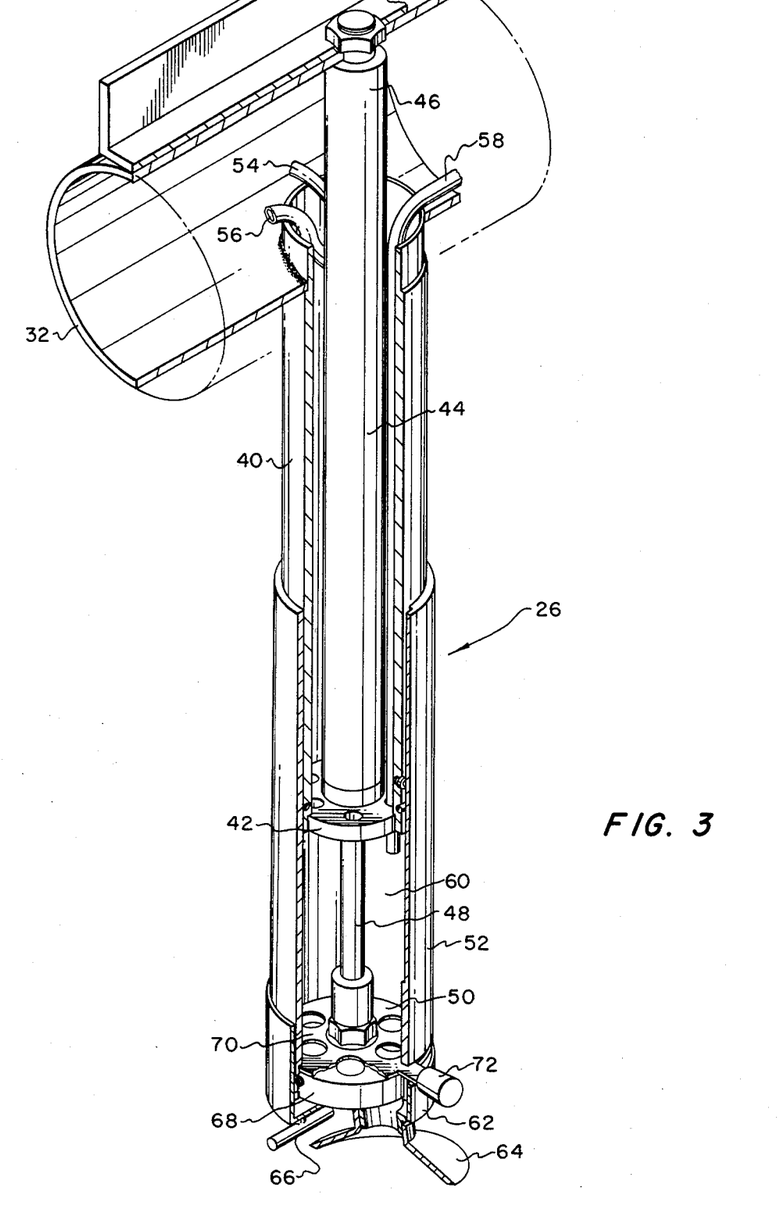
FIG. 3 is a perspective view, partly in crosssection, illustrating one of the extendable heads used in the apparatus of FIG. 1 that is constructed in accordance with the invention.

FIG. 3 illustrates in detail the structure of the heads and specifically of one of the heads 26. The head 26 shown includes a fixed inner tubular member 40 that has its upper end attached to the cylindrical member 32 and is provided at its lower end with a perforated plate 42. Within the tubular member 40 there is positioned a double acting cylinder 44 that has its upper end 46 also connected to the cylindrical member 32. A piston rod 48 projects from the lower end of the cylinder 44 and extends through the perforated plate 42. Attached to the lower end of the piston rod 48 is a vacuum adjusting device 50 and attached to and surrounding the device 50 is an outer cylindrical tube 52. To cause reciprocation of the rod 48 within the cylinder 44, conduits 54 and 56 are connected to the cylinder 44 in the usual manner for a double acting cylinder.

As also can be seen in FIG. 3, there is a small conduit 58 that extends downwardly within the inner tubular member 40 and outside of the cylinder 44 projecting through the perforated plate 42 into a space 60. The space 60 will be referred to hereinafter as a vacuum space. The space 60 is located between the vacuum adjusting device 50 and the perforated plate 42.

At the lowermost end of the outer cylindrical tube 52 and below the vacuum adjusting device 50 there is provided a chamber forming member 62 that is in communication with the perforations extending through the vacuum adjusting device 50 and in communication with a suction cup or pickup member 64 that engages the plates 16 or separators 30, whichever is appropriate. Mounted on the chamber forming member 62 is a T-bar 66 that is arranged to extend slightly below the lowermost end of the suction cup 64, for purposes that will become more apparent hereinafter.

Referring again to the vacuum adjusting device 50, it can be seen that there is a lower perforated plate 68 that is attached to the outer cylindrical tube 52. Disposed on top of a lower perforated plate 68 is an adjusting perforated plate 70 that has an adjusting knob 72 projecting outwardly through a slot in the outer cylindrical tube 52. Since the position of the perforations in the adjusting plate 70 can be varied with respect to the perforations in the lower perforated plate 68, the flow area extending through the vacuum adjusting device 50 can be varied. Accordingly, the differential in pressure flowing through the suction cup 64 into the vacuum chamber 60 is thus adjusted to vary the pressure in the vacuum chamber 60. The lower pressure exists in the vacuum chamber 60 since the chamber 60 is in communication with the interior of the cylindrical member 32 via the perforated plate 42. As previously mentioned, the interiors of the cylindrical member 32 and the cylindrical member 34 are at a reduced pressure or partial vacuum due to the communication between the members, at appropriate times, and the conduit 20 which leads to the inlet of the blower 24.

Figure 4:
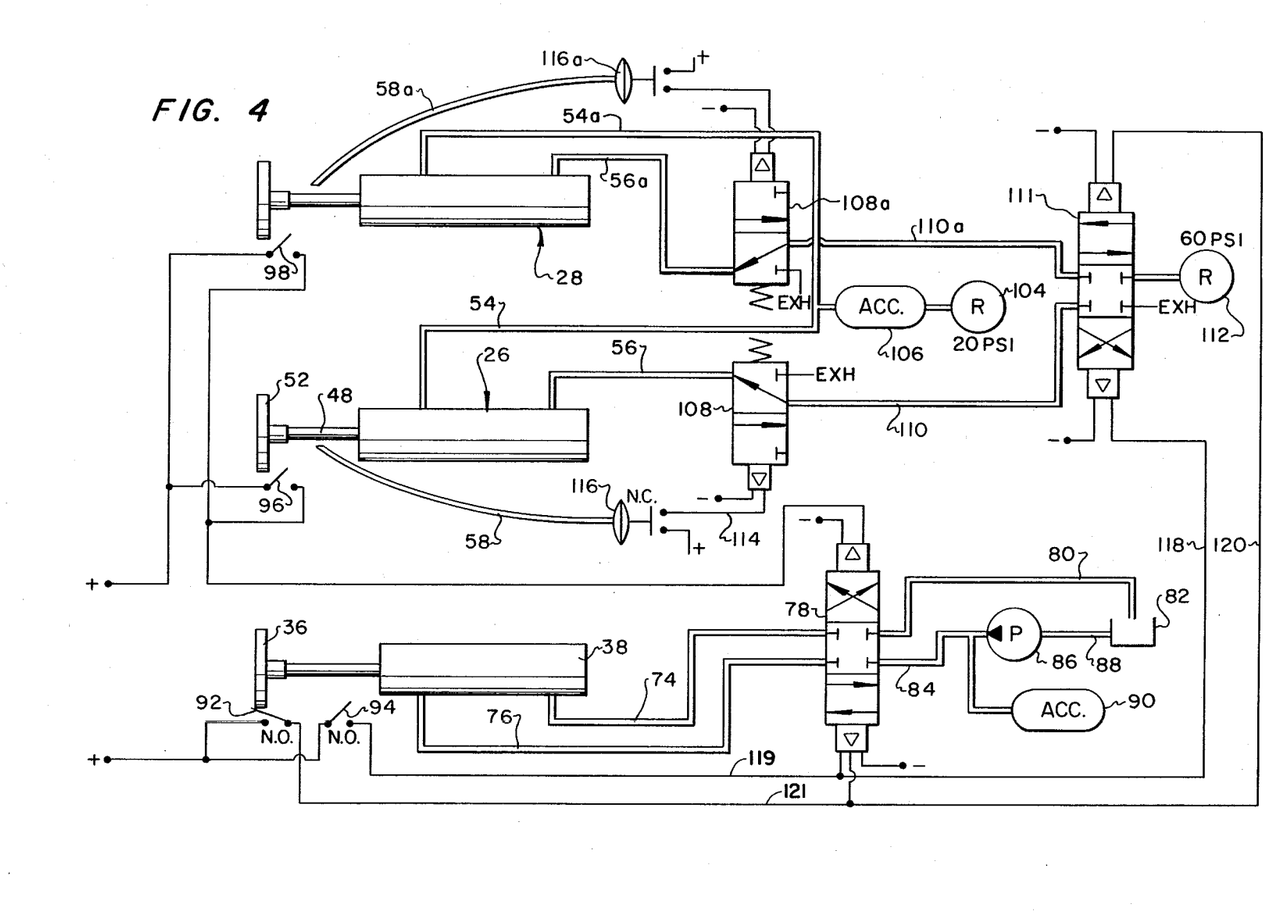
FIG. 4 is a schematic diagram illustrating control system for the battery stacker of FIG. 1 that is also constructed in accordance with the invention.

FIG. 4 schematically illustrates in simplified form the various controls utilized in the plate stacking apparatus 10. As illustrated therein, the swing cylinder 38 is connected by conduits 74 and 76 with a solenoid-actuated valve 78. The valve 78 is connected by a conduit 80 to a hydraulic fluid reservoir 82 and by a conduit 84 with the outlet of a pump 86. The pump is connected to the reservoir 82 by a concuit 88. Interposed in the conduit 84 is an accumulator 90.

The valve 78 is a multi-purpose valve connected by conductors 119 and 121 and is controlled by limit switches 92 and 94 that are physically located adjacent to the swing link 36 and near the ends of the travel thereof. The valve is positioned by these limit switches 92 and 94 so that hydraulic fluid flows from the pump 86 to the swing cylinder 38 through either the conduit 74 or the conduit 76, depending upon which of the limit switches is actuated. In another position, the valve 78 is shifted to a position blocking the conduits 74 and 76 preventing operation of the swing cylinder 38.

The valve 78 is shifted to the position blocking the conduit 74 and 76 when any of switches 96 or 98 are open. The switches 96 and 98 are located adjacent to each of the heads 26 and 28, respectively. The switches 96 and 98 are positioned in such a manner that they are closed by engagement with a portion of the outer cylindrical tube 52 when the outer cylindrical tube is in its uppermost position, that is, when the heads 26 and 28 are fully retracted. The aforedescribed arrangement is provided so that the plurality of heads 26 or the plurality of heads 28 cannot be swung from their respective stacks 16 and 30 to the conveyor 18 until all of the heads 26 or 28 are in the fully retracted position.

It should be pointed out that the switches 96 and 98 may be utilized on each head 26, 28 or in lieu thereof, the electric eyes 100 and 102 shown in FIGS. 1 and 2 may be utilized. As will be appreciated, the electric eyes are positioned so that any of the heads 26 or 28, not fully retracted, will interrupt the beam in the electric eye circuits and cause the valve 78 to move to the blocking position, thus preventing swinging of the heads 26 and 28.

The systems for controlling the extension and retraction of the heads 26 and 28 are substantially identical. The double acting cylinders 44 are connected by conduits 54 and 54a with a regulator 104 that is set at approximately 20 PSI. The regulator will, of course, be connected to a source of pressurized air (not shown) which is above the 20 PSI valve. Interposed in the conduits 54 and 54a is an accumulator 106. It will be noted that no valve is positioned between the regulator 104 and the heads 26 and 28 so that the 20 PSI air pressure is constantly imposed on the piston rods 48 into the cylinders 44 in a direction to retract the piston rods 48 into the cylinders 44.

Conduits 56 and 56a connect the heads 26 and 28 with solenoid-actuated valves 108 and 108a which are connected with a solenoid-actuated valve 111 by conduits 110 and 110a. The valve 111 is connected to a regulator 112 that is set at approximately 60 PSI and the regulator 112 is connected with the air supply source (not shown). The 60 PSI air supply passing through the conduits 110 and 56 and conduits 110a and 56a is imposed on the head in such a manner as to extend the piston rods 48.

The solenoid-actuated valve 111 is in a position exhausting air from the conduits 110 and 110a and from the heads 26 and 28 when the switches 92 and 94 are open so that the heads cannot be extended. The valve 111 is shifted into a position so that the 60 PSI air is supplied to the head 26 to extend the rod 48 of the head 26 and exhaust conduit 110a when the switch 92 is closed. The switch 92 is connected by conductor 120 to valve 111. Conductor 118 connects switch 94 with the valve 111 so that valve 111 is moved to a position exhausting the conduit 110 and pressuring the conduit 110a and the head 28 when switch 94 is closed.

One of the features of this invention is to provide a plate stacking apparatus that will not operate if one of the heads fails to pick up a plate or separator from the appropriate stack. In this embodiment of the invention, one way of assuring that a plate is picked up is through the use of diaphragm-actuated switches 116 and 116a that are connected by the conduits 58 and 58a with vacuum chambers 60 (see FIG. 3).

The diaphragm-actuated switches 116 and 116a are normally closed so that the solenoid-actuated valves 108 and 108a are in a position to provide 60 PSI air to the heads 26 and 28. When the switches 116 and 116a are open air is exhausted from lines 56 and 56a.

With air being drawn through the cylindrical member 32 by the blower 24, the adjusting perforated plate 70 is rotated by use of the knob 62 to adjust the pressure in the vacuum chamber 60. This pressure is adjusted so that it will not be sufficient to open the normally-closed, diaphragm-operated switch 116. Accordingly, the head 26 remains extended.

When a plate covers the suction cup or pickup member 64, the pressure in the vacuum chamber 60 drops sufficiently to open the switch 116. When this occurs, current is interrupted to the solenoid-actuated valve 108 and the valve immediately shifts to exhaust air from the conduit 56 and the head 26. The 20 PSI air being applied to the head 26 through the conduit 54 then causes the head 26 to retract with the attached plate thereon.

Each of the heads 26 and 28 is provided with a vacuum sensing device such as the conduit 58, 58a, etc., that is connected to a diaphragm-actuated switch 116, 116a, respectively. Thus, should any of the heads fail to have a plate attached thereto, the proper vacuum will not be generated and that head will not retract fully because the solenoid-actuated valve 108 remains in a position wherein the 60 PSI air is connected to the head maintaining its extended position.

Figure 5:
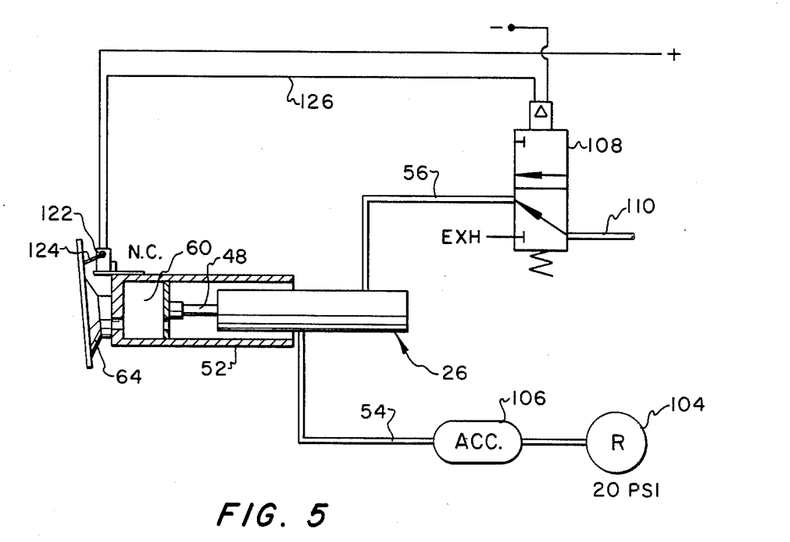
FIG. 5 is a schematic view similar to a portion of FIG. 2, but illustrating a modification thereof.

FIG. 5 illustrates an alternate embodiment of the apparatus just described for assuring that a plate will be picked up by each head. The embodiment of FIG. 5 may be used in lieu of that illustrated in FIG. 4 or as a redundant system if desired. As illustrated therein, the outer cylindrical tube 52 is provided near its lower end with a microswitch 122 having a switch actuating arm 124 projecting therefrom into a position wherein it engages a plate picked up by the pickup member 64. The switch 122 is normally closed so that the solenoid valve 108 to which it is electrically connected by a conductor 126 is in a position wherein 60 PSI air is supplied to the head 26 via the conduit 56 extending the piston 48 therein toward the stack of plates or separators. When the pickup member 64 is in engagement with the plate, the plate moves the arm 124 of the microswitch to a position to open the microswitch 122. The power supply to the solenoid valve 103 is interrupted and thus the valve 108 returns to a position wherein air from the head 26 is exhausted and only the 20 PSI air 54 is imposed thereon. Accordingly, the head 26 retracts.

Figure 6:
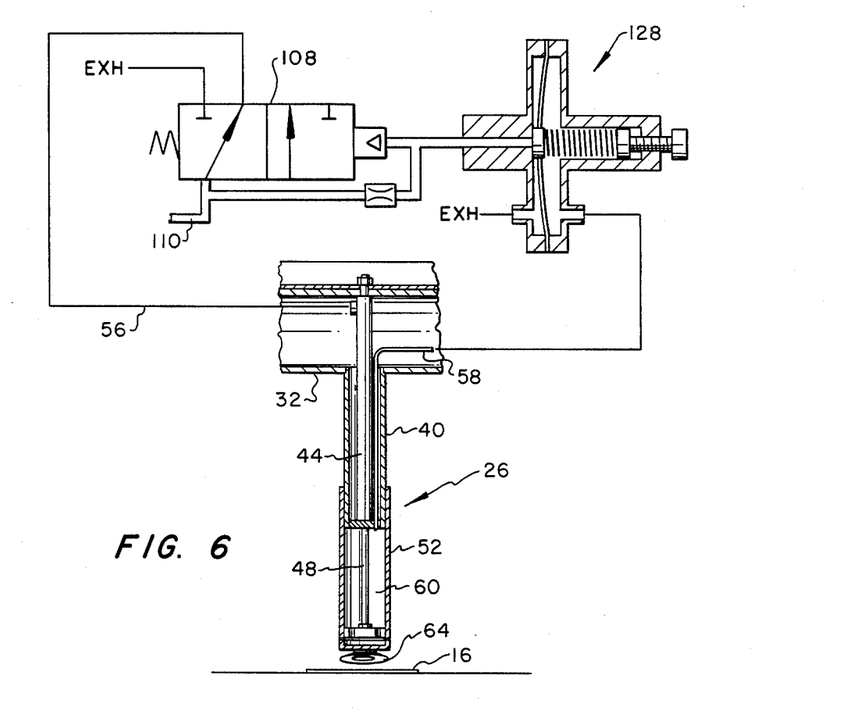
FIG. 6 is a schematic view illustrating another embodiment of control system utilized in the invention.

FIG. 6 illustrates a further modification of the apparatus of FIG. 4 that is provided to assure that a plate is attached to each of the heads. In the apparatus of FIG. 6, a diaphragm-actuated valve designated by the reference character 128 is provided to replace the diaphragm-actuated switch 116 and the solenoid valve 108. The diaphragm-actuated valve 128 is normally closed, that is, the valve is in a position wherein the 60 PSI air supplied through the conduit 110 passes through the valve 108 into the conduit 56 to the head 26 to extend the head 26 toward the stack 16. When a plate from the stack 16 is attached to pickup member 64, lower pressure is developed in the vacuum chamber 60 which, through the conduit 58, causes the diaphragm to flex and shift the valve 128 to a position wherein the air in the conduit 56 is exhausted to atmosphere. As mention before, when this occurs, the 20 PSI air, which is imposed on the lower end of the cylinder 44, causes the head 26 to retract.

The diaphragm-actuated valve 128 and the diaphragm-actuated switch 116 can, of course, be adjusted to vary the pressure necessary to cause the valve to open, permitting retraction of the head 26. Such adjustment may be necessary due to the variation in the porosity and permeability of the materials used in the plates and separators.

Figure 7:
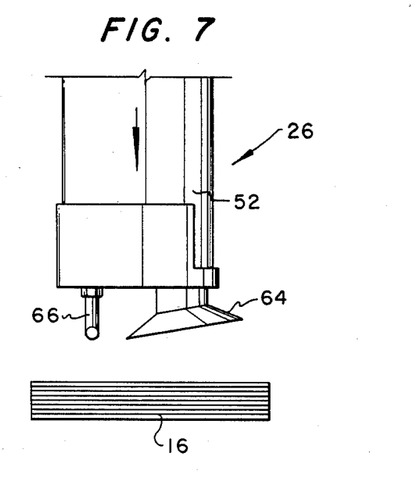
FIG. 7 and FIG. 8 are partial elevation views illustrating the flexing of the plates or separators during the operation of the extendable heads and pickup apparatus.
Figure 8:
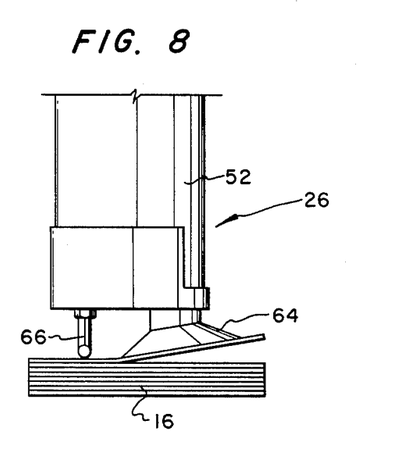

One problem that was previously mentioned as occurring in battery plate stacking apparatus is the inability of the previously constructed devices to consistently pick up only one plate or separator at a time. FIGS. 7 and 8 illustrate one method utilized in the apparatus 10 for performing this. As illustrated in FIG. 7, the head 26 is being extended downwardly with the T-bar 66 approaching the uppermost plate on the stack of plates 16. It will be noted that the T-bar extends slightly below the lowermost end of the pickup member 64 so that the T-bar 66 engages the top plate first. When the T-bar 66 engages the top plate, the downward motion of the head 26 stops and the air flowing upwardly through the pickup member 64 moves the uppermost plate in the stack of plates 16 toward the member 64. Since the member 64 is set at an angle relative to the position of the plates, the plate is flexed slightly as illustrated in FIG. 8 when it is held in position on the pickup member 64. The slight flexure involved permits air to enter between the plates or separators, assuring that only one plate or separator is attached to the pickup member 64.

Although not illustrated, the T-bar member 66 may be omitted, particularly where the plates are of relatively small size. In this instance, the head 26 engages the plates at the lowermost edge of the pickup member 64. When this occurs, the air flowing upwardly through the pickup member 64 again attracts the upper plate, flexing it slightly so that air separation does occur between the plates, thus assuring that only one plate is attached to the head 26.

It should also be mentioned that the conveyor 18 (see FIGS. 1 and 2) extends through the apparatus 10 between the stacks of plates 16 and the stacks of separators 30 and outwardly of the machine as is illustrated in FIG. 1. The conveyor 18 is preferably advanced in steps so that for each swing of the heads 26 and 28, a plate or separator as is appropriate is positioned on the conveyor 18 so that by the time the conveyor has traversed the entire length of the apparatus 10, a completed stack of plates and separators will be assembled and ready for removal from the conveyor 18 for placement in the battery case.

Although the operation of the apparatus 10 has been described generally as the structural description proceeded, the following summary of the operation may aid in understanding a apparatus 10.

With the machine 10 operating, and with the appropriate stacks of plates 16 and appropriate stacks of separators 30 positioned on the frame 14, the swing cylinder 38 has moved the heads 26 and 28 into the position illustrated in FIG. 2 through its pivotal connection therewith through the linkage member 36 and the pivotably mounted cylindrical tubes 32 and 34. In this position, the head 28 has deposited a separator on the conveyor 18 and the head 26 is in position to pick up the next plate off the stack of plates 16. Since the limit switch 92 is closed, power is supplied to the solenoid valve 111, causing the valve to move to a position delivering 60 PSI air to the head 26, exhausting the head 28, and extending the head 26 to the position illustrated. If a plate is attached to the pickup member 64, the vacuum increases in the vacuum chamber 60 and, through the conduit 58, actuates the diaphragm switch 116 to open the circuit to the solenoid valve 108 causing it to move to the position to exhaust air from the head 26 through the conduit 56. At this time, the head 26 retracts in response to the 20 PSI air in the conduit 54.

When all of the heads have retracted and either actuated the microswitches 96 and 98 or cleared the electric eyes 110 and 102, the solenoid valve 78 is actuated to cause the swing cylinder 38 to swing the heads so that the heads 28 are now positioned over the stacks of separators 30 and the heads 26 are positioned over the conveyor 18 to drop the plates which were picked up from the stacks 16.

The differential in pressure holding the plates and separators on the heads is equalized by exposing the interior of the appropriate cylindrical tube 32 or 34 to the atmosphere. A sliding gate valve (not shown) but like that illustrated in FIG. 8 of U.S. Pat. No. 4,534,549 is positioned in timed relation to the swing motion of the heads so that when the heads are located over the conveyor, the gate valve is opened, releasing the plates or separators to drop onto the conveyor.

Figure 9:
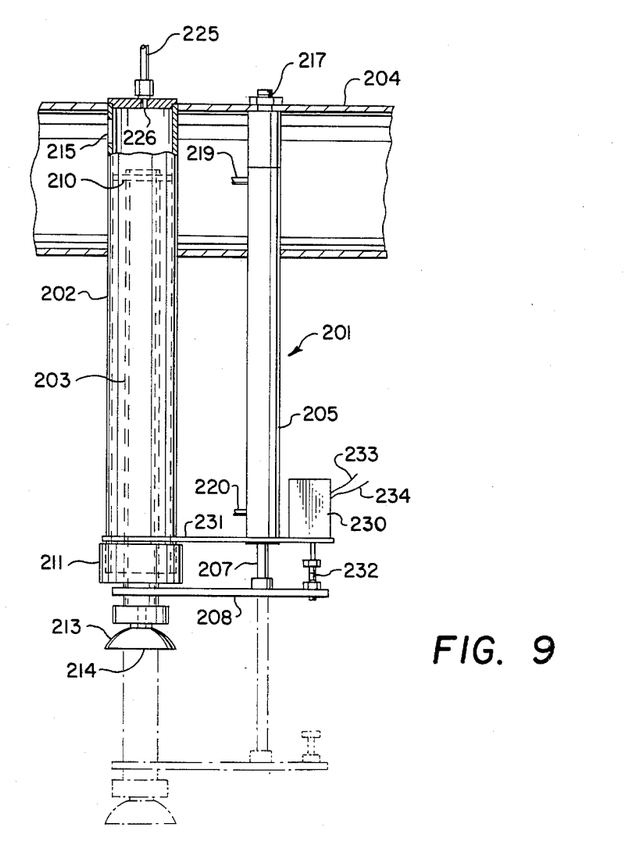
FIG. 9 is another representation of an extendable head or vacuum pick-up mechanism useful in the system of FIG. 1.

Referring now to FIG. 9 there is illustrated a modification of the pick-up means 26 of FIG. 3. The pick-up means 201 includes coaxial cylinders 202 and 203. The upper portion of the outer cylinder 202 is secured to the topmost part of the vacuum manifold or cylinder 204 and extends downwardly to a lower portion of the manifold 204. The inner cylinder 203 is driven up and down by a double acting cylinder 205 which includes piston 207. The lower portion of the piston 207 is secured to a bracket 208, one end of which is fixed to the inner cylinder 203.

The upper portion of the inner cylinder 203 is guided for movement along the outer cylinder by an O-ring or similar device which may be formed of nylon. The lower portion of the inner cylinder 203 is guided through an end cap 211 which also serves to seal off the lower portion of the outer cylinder 202. Secured to the lower end of the inner cylinder 203 is a flexible cup-shaped member 213 having a central opening 214 for the purpose of engaging the topmost element of a supply of elements. In the specific embodiment described the elements are battery elements. A vacuum is applied to the flexible cup-shaped member 213 from the vacuum manifold 204 by way of an aperture 215 in the uppermost portion of the outer cylinder 202. The vacuum, together with the flexible cup-shaped member 213, is utilized to engage and secure the cup-shaped member 213 to the topmost element of the supply of battery elements.

The double acting cylinder 205 is secured to the top of the vacuum manifold 204 by way of a threaded nut assembly 217 and extends downwardly through a lower portion of the manifold 204. A supply of pressurized fluid of one value is supplied by way of conduit 219 to one end of the cylinder 205 and another supply of pressurized air of different value is applied to an opposite end of the cylinder 205 by way of conduit 220. Pressurized air is continuously applied to the lower end of the double acting cylinder 205 by way of conduit 220 and is employed to raise the pick-up means. The pressurized air applied to the upper end of the double acting cylinder 205 by way of conduit 219 is controlled in on/off states. The value of the pressurized air applied by way of conduit 219 is of higher value than that applied by way of conduit 220. When the former is activated it is effective to drive the piston 207 downward to carry with it the flexible pick-up head 213 in order to engage an element. The extended positions of the pick-up head 213 and the piston 207 are illustrated in dashed lines. When the pressurized air or fluid applied by way of conduit 219 is relieved or off the existing pressurized air applied by way of conduit 220 is effective to raise the pick-up head 213.

The raising and lowering resulting from the selective application of pressurized air by way of conduit 219 to the double acting cylinder 205 is under control of a sensing and control mechanism including means for sensing the value of vacuum at the flexible pick-up head 213. The sensing mechanism includes a conduit 225 connected to an aperture 226 in the upper portion of the outer cylinder 202. Absent an element or plate attached to the head 213 the vacuum at aperture 226 and conduit 225 will be approximately the same value as the vacuum at the flexible pick-up head 213. When an element or plate is engaged by the flexible pick-up head 213 the value of the vacuum within the cylinder 203 and at the aperture 226 changes, it actually increases, i.e. the pressure lowers and these variations in pressure are utilized as a mechanism to control the application of pressurized fluid by way of conduit 219 to the double acting cylinder 205 to effect a raising and lowering of the piston 207 and hence the pick-up means including the flexible pick-up head 213.

A push-button type sensing switch 230 is mounted to one end of a bracket 231 the opposite end of which is secured to the outer cylinder 202. The bracket 231 also supports the lower end of the double acting cylinder 205. The purpose of the push-button switch 230 is to sense the full retraction of the pick-up means. To this end an activator element 232 is threadably connected to the bracket 208. The activator element is adjustable by the threaded connection to assure activation of the switch 230 when the pick-up means is in a fully retracted position. Each pick-up means of the plurality of pick-up means includes a push button switch 230. The output of the switch 230 as represented by conductors 233, 234 are connected in series with all other switches 230 to a control element (not shown) which is activated to cause the pick-up means to swing from a pick-up position to a depositing position when and only when all the switches 230 are closed. This assures that an element or battery plate element is being carried by each of the pick-up means before the pick-up means are swung to an unloading or depositing position.

By locating the double acting cylinder 205 outside the cylinders 202, 203 comprising part of the pick-up means, there is avoided the accumulation of dust and small particles that are otherwise drawn up through the concentric cylinders and thus in turn avoid the build up of particles on the exposed shaft of the piston 207, the accumulation of which could interfere with proper operation of the double acting cylinder.

Figure 10:
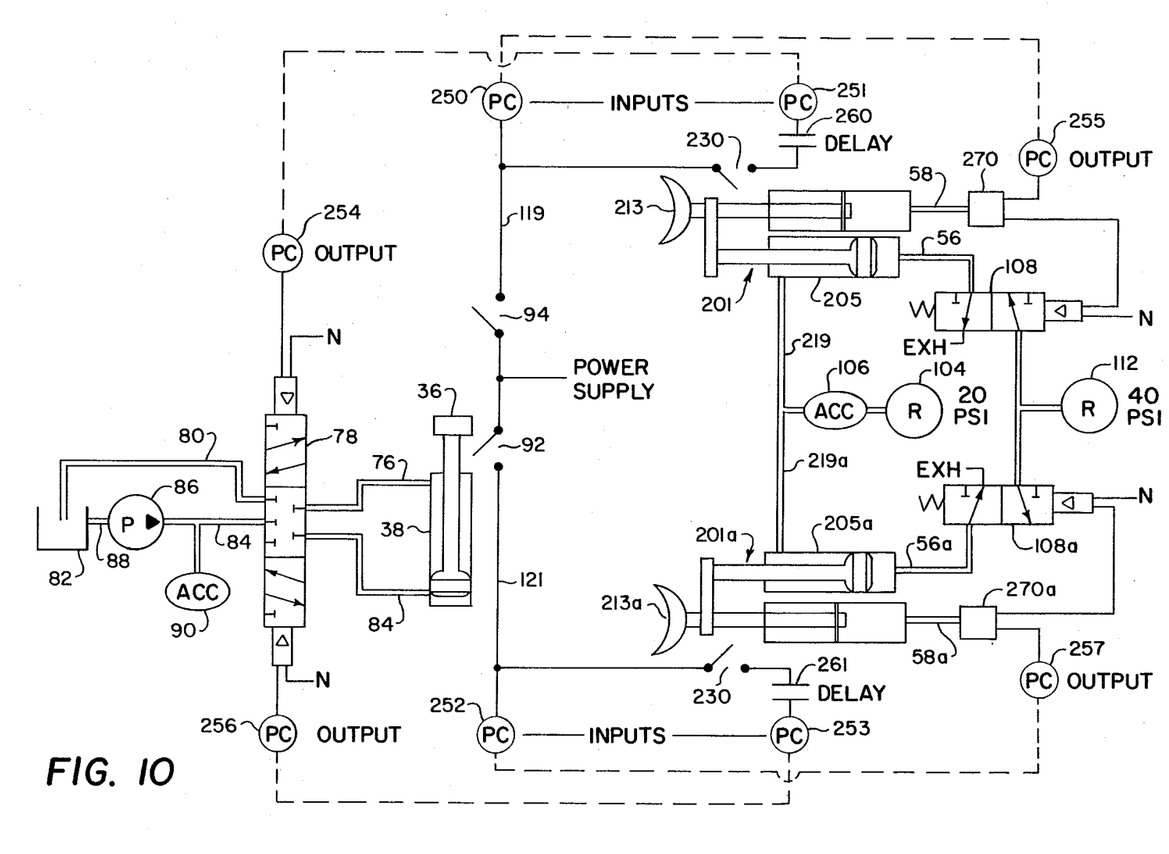
FIG. 10 is a schematic diagram illustrating another form of control system embodying the present invention.

Referring now to FIG. 10 where there is illustrated a modification of the control system illustrated in FIG. 4. The two systems, that of FIG. 4 and FIG. 10 are similar in many details. The principal difference lies with the use in the system of FIG. 10 of a programmable controller comprised of inputs 250, 251, 252 and 253 and outputs 254, 255, 256 and 257. A suitable programmable controller is available from the Allen Bradley Company and identified as Model PLC-4. In addition the modification of FIG. 10 includes delay means 260 and 261 which are effective to delay the response of the mechanism for swinging the pick-up means between load and unload positions. The delay means 260 and 261 may be of the electrical delay line type or may be implemented by way of timers.

It will be recognized from earlier description that the system is designed to swing the pick-up heads to an unload or deposit position only when the series of sensing switches, such for example, as the switches 230 (FIG. 9) are all in the closed position. This occurs under two conditions. One of the conditions is during normal operation of the system when all the pick-up heads are loaded and the vacuum sensing control mechanism then causes the exhaust of the higher pressure fluid in the double acting cylinder to cause the pick-up heads to retract. The second condition occurs, when for one reason or other during the operation of fabricating the assembly of battery elements an operator decides to shut down the system. When shut down occurs power is lost to the control system and the high pressure fluid is automatically exhausted from all the double acting cylinders causing all pick-up heads to be retracted. This in turn closes all switches 230 regardless of whether a pick-up means is loaded or not. Now when power is returned to the system, since all switches 230 are closed, the swing mechanism ordinarily would be energized to cause the pick-up means to swing to an unload or deposit position, whereas in fact, not all the pick-up means would be loaded with a battery element. To avoid this latter situation from occuring the delay means 260 and 261 are provided, which in effect delay the response of the swing mechanism to the closure of all switches 230. As a result, when the system is restarted with all switches closed, the delay provides sufficient time for the various vacuum sensing devices to determine whether or not a particular pick-up means is loaded or unloaded. If unloaded, high pressure fluid is directed immediately to that particular pick-up means to drive it downward resulting in an interuption of one of the switches 230, thereby inhibiting operation of the swing mechanism until the pick-up means return in a loaded state to the uppermost position and again close switches 230.

As aforesaid, the control system of FIG. 10 is similar to that of FIG. 4 and to that extent the same reference characters apply to the components or elements of FIG. 4 are applied to the equivalent elements in FIG. 10. Accordingly it is believed unnecessary to again describe the complete operation. To avoid unnecessary redundancy, further description regarding FIG. 10 will be limited to those aspects that differ from those of FIG. 4.

The system of FIG. 10 derives power from POWER SUPPLY connected between switches 92 and 94. With the swing mechanism in one position to close switch 92, power is applied by way of conductor 121 to programmable controller input 252 and by way of switch 230a and delay means 261 to another input 253 of the programmable controller. By way of connections within the controller, shown by dashed lines, power is applied from input 252 to output 257 and thence to the vacuum sensing switch 270a. With switch 270a closed, power is applied to the solenoid switch 108a to apply high pressure air from the source 112 by way of the solenoid actuated valve 108a and conduit 56a to drive the piston within the double acting cylinder 205a downward to cause the flexible cup-shaped member 213a to engage a battery element. Once the element is engaged the vacuum sensed by switch 270a increases causing switch 270a to open and thereby disable the solenoid actuated switch 108a. The disabling of the switch 108a causes the high pressure air to exhaust and the low pressure air from source 104 will then control the pick-up means 201a to move to its uppermost position where switch 230 is closed. Power is now applied by way of switch 230a and delay 261 to input 253 of the programmable controller. This power now appears at the output 256 and thence to one end of solenoid control valve 78. Since all switches 230a are connected in series, power will be applied only when all switches are closed, whereupon the solenoid actuated valve 78 will be operated to now drive the piston 36 in an opposite direction to open switch 92 and close switch 94. Upon closure of switch 94 similar action takes place with the mechanism on the opposite side of the conveyor belt involving pick-up means 201. The delay means 260, the inputs 250 and 251 of the programmable controller functioning in conjunction with outputs 254 and 255, in like manner as above described, cause the pick-up heads to swing from a load to an unload position only when the vacuum switches 270 are open and all contact switches 230 are closed.

Figure 11:
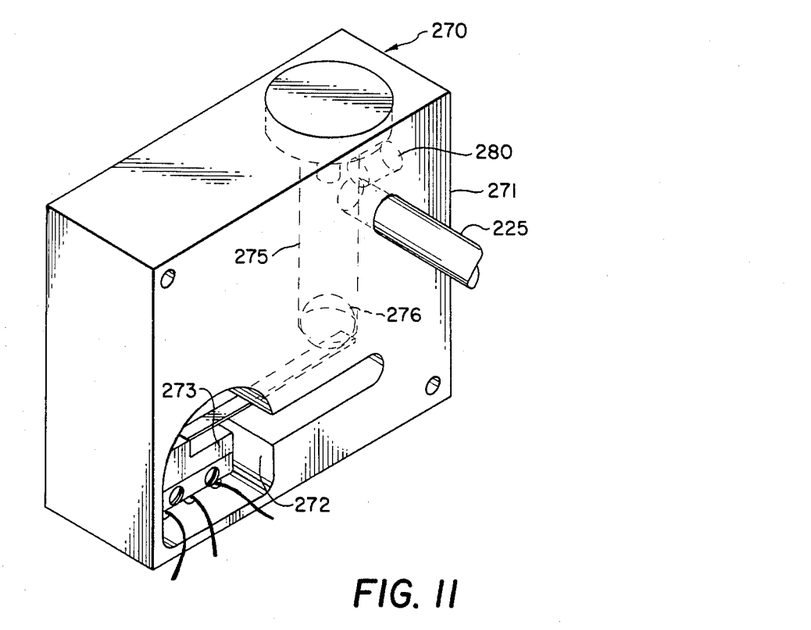
FIG. 11 is a perspective view of a preferred form of vacuum sensing switch.

A further modification of a vacuum sensing mechanism or switch is illustrated in FIG. 11. This particular form of vacuum sensing switch is the subject matter of co-pending application Ser. No. 827,389, which the present Applicant filed Feb. 10, 1986 entitled "Vacuum Sensitive Switch" now U.S. Pat. No. 4,692,575 issued Sept. 8, 1987.

The switch assembly 270 comprises a plastic body 271 recessed at 272 to receive a long armed microswitch 273. The body 271 is drilled out at 275 to form a chamber receiving a ball 276 having a diameter slightly less than the diameter of chamber 275. Conduit 225 is placed within the housing 271 and intersects with the chamber 275. The conduit 225 is connected to the source of vacuum as shown in FIG. 9. Another aperture 280 is provided to exhaust the upper portion of the chamber 275 to the atmosphere.

Absent any significant vacuum the ball 276 falls to the bottom of the chamber 275 and rests upon the arm of the microswitch 273 to close the switch. Upon the application of an increase in vacuum by way of conduit 225 the ball is lifted from its engagement with the microswitch arm and causes the microswitch to open. The sensitivity of the switch in response to vacuum can be adjusted by varying the effective cross-sectional area of the aperture 280.

The vacuum switch 270 is extremely sensitive, for example, 0.5" water and is thus able to detect fluctuations in relatively low vacuum levels.

From the foregoing it will be apparent that the systems described herein in detail provide means for picking up either one plate or one separator with each of the pick-up means and transporting the appropriate plate or separator to the conveyor where it is deposited. The pick-up heads cannot swing from the stack to the conveyor and vice-versa unless all the heads are retracted and the heads cannot retract unless there is a plate or separator attached thereto. It should be apparent to those skilled in the art that the invention disclosed in detail herein is presented by way of example only and that there are many changes and modifications that may be made thereto without departing from the spirit and scope of the appended claims.

What is claimed is:

1. Apparatus for capturing topmost elements from supplies of battery elements and transferring the captured topmost elements to depository zones comprising:
    a plurality of vacuum pick-up means, each said means comprising a flexible cup-shaped member having a central opening,
    each said pick-up means having stationary sensing means remote from its said cup-shaped member for sensing variations in vacuum pressure applied to said cup-shaped member,
    means independent of time responsive to said sensing means for individually moving each said pick-up means toward and away from the topmost elements of the supplies of elements,
    switch means responsive to maximum movement of said cup-shaped members each with a captured element away from the supply of elements,
    means responsive to said switch means for moving said cupshaped members with captured elements simultaneously toward a zone for depositing the elements held by said pick-up means only when all said cup-shaped members have attained said maximum movement with captured elements.

2. Apparatus according to claim 1 including means responsive to said moving means responsive to said switch means for preventing lowering of said cupshaped members toward the deposit zone following the deposition of the elements.

3. Apparatus according to claim 1 in which each said means for moving said pick-up means toward and away from said supplies of elements includes a double acting cylinder external to said pick-up means, a piston within said cylinder having one end extending beyond said cylinder and mounted externally to said pick-up means,
    means responsive to said sensing means for applying pressurized gas of one value of pressure to one end of said cylinder to drive said piston and said pick-up means downward toward said supply of elements, and
    means for continuously applying pressurized gas of a second value of pressure lower than said one value of pressure to an opposite end of said cylinder to drive said piston and said pick-up means upward upon absence of said one value of pressure.

4. Apparatus according to claim 1 including means for delaying the response of said means responsive to said switch means.

5. An apparatus for picking up and interlayering in stacks battery elements comprising:
    conveyor means,
    means for receiving stacks of horizontally disposed first battery elements along one side of said conveyor means,
    means for receiving stacks of horizontally disposed second battery elements along an opposite side of said conveyor means,
    a first plurality of retractable and extendable heads, one for each of the stacks of first battery elements,
    a second plurality of retractable and extendable heads, one for each of the stacks of second battery elements,
    vacuum pick-up means carried by each said first plurality of heads, each said pick-up means being moveable into contact with the top element in the stack associated with that pick-up means upon extension of its associated head,
    vacuum pick-up means carried by each said second plurality of heads, each said pick-up means being moveable into contact with the top element in the stack associated with that pick-up means upon extension of its associated head,
    each pick-up means carried by said first plurality of heads including means for initially contacting a top element whereby the affect of vacuum will flex the top element to effect the withdrawal of only the top element from a stack of first battery elements,
    each pick-up means carried by said second plurality of heads including means for initially contacting a top element whereby the affect of vacuum will flex the top element to effect the withdrawal of only the top element from a stack of second battery elements,
    means for sensing the engagement of a top element of said stack of first battery elements with its said associated pick-up means, means for sensing the engagement of a top element of said stack of second battery elements with its said associated pick-up means, control means independent of time responsive to said top first battery element engagement sensing means for retracting each said first plurality of heads only when said pick-up means is loaded with a first battery element attached thereto;

control means independent of time responsive to said top second battery element engagement sensing means for retracting each said second plurality of heads only when said pick-up means is loaded with a second battery element attached thereto;

means for moving said first battery element pick-up means over said conveyor means only when all loaded heads have been retracted, and means for moving said second battery element pick-up means over said conveyor means only when all loaded heads have been retracted.

6. The apparatus of claim 5 in which said sensing means is a micro switch on each head operated when an associated pick-up means is loaded.

7. The apparatus of claim 5 wherein said sensing means detects a change in vacuum when a pick-up means is loaded.

8. The apparatus of claim 7 wherein said control means is a pressure actuated valve responsive to the sensed change in vacuum to enable the retraction of said head and associated pick-up means.

9. The apparatus of claim 5 including means for sensing the position of said first plurality of retractable and extendable heads, and means responsive to said position sensing means to enable said means for moving said first battery element pick-up means over said conveyor only when all said first plurality of heads have been retracted.

10. The apparatus of claim 5 including means for sensing the position of said second plurality of retractable and extendable heads, and means responsive to said position sensing means to enable said means for moving said second battery element pick-up means over said conveyor only when all said second plurality of heads have been retracted.

11. The apparatus of claim 5 in which each said pick-up means includes means forming a partial vacuum in its associated head whereby a battery element is held in engagement with said pick-up means due to the differential in pressure across the element, a normally closed switch responsive to said pressure differential, and a solenoid-actuated valve means responsive to the condition of said switch for controlling the movement of said head between retracted and extended positions.

12. A method of picking up and interlayering in stacks battery plates and battery plate separators comprising the steps of:
a. placing stacks of horizontally disposed battery plates along one side of a conveyor means,
b. placing stacks of horizontally disposed separators along an opposite side of the conveyor means,
c. engaging a portion of each top battery plate,
d. flexing each top battery plate against said engagement to effect a separation between said top plates and adjacent plates in said stacks,
e. effecting a temporary connection with said top plates,
f. individually sensing that the connection has been made with top plates,
g. upon sensing the connection with each top plates, independently of time removing each top plate from its stack,
h. sensing that all top plates have been removed from their related stacks,
i. transferring each top plate to said conveyor only when all top plates have been removed from their respective stacks, and
j. repeating steps c. through i. for said separators.

13. The method of claim 12 wherein said step of effecting a temporary connection includes the step of forming a differential pressure across said top plates tending to move said plates away from their respective stacks.

14. The method of claim 13 further including the steps of sensing said differential in pressure and transmitting a signal representative thereof; and comparing said transmitted signal with a predetermined value and preventing movement of said temporarily attached plates away from said stacks if said signal does not exceed said predetermined value.

15. The method of claim 14 including the steps of sensing the completion of the generally upward movement of said temporarily attached plates and transmitting a signal upon completion of such movement; and completing said transferring step for said plates to said conveyor upon receipt of said signal indicating completion of the generally upward movement of said attached plates.

* * * * *